(12) United States Patent
Yaakov

(10) Patent No.: US 6,748,433 B1
(45) Date of Patent: Jun. 8, 2004

(54) METHOD AND SYSTEM FOR CONTROLLING QUALITY OF SERVICE OVER A TELECOMMUNICATION NETWORK

(75) Inventor: Yaron Yaakov, Lapid (IL)

(73) Assignee: Ectel, Ltd., Petach Tikva (IL)

( * ) Notice: Subject to any disclaimer, the term of this patent is extended or adjusted under 35 U.S.C. 154(b) by 720 days.

(21) Appl. No.: 09/613,461

(22) Filed: Jul. 10, 2000

(30) Foreign Application Priority Data

Jul. 12, 1999 (IL) .............................................. 130895

(51) Int. Cl.⁷ ........................................... G06F 15/173
(52) U.S. Cl. ....................... 709/224; 709/223; 709/236; 370/241; 370/401
(58) Field of Search ................................ 709/200–203, 709/223–224, 236–238, 246; 370/224–230, 241, 395.2, 395.21, 401–402

(56) References Cited

U.S. PATENT DOCUMENTS

| | | | |
|---|---|---|---|
| 5,883,819 A | | 3/1999 | Abu-Amara et al. ............ 716/1 |
| 6,055,571 A | * | 4/2000 | Fulp et al. ................... 709/224 |
| 6,308,216 B1 | * | 10/2001 | Goldszmidt et al. ......... 709/223 |
| 6,385,204 B1 | * | 5/2002 | Hoefelmeyer et al. ...... 709/401 |
| 6,446,122 B1 | * | 9/2002 | Rawat et al. ................ 709/224 |
| 6,466,985 B1 | * | 10/2002 | Goyal et al. ................ 709/238 |
| 6,631,135 B1 | * | 10/2003 | Wojcik ................... 370/395.21 |
| 6,636,516 B1 | * | 10/2003 | Yamano ...................... 370/401 |
| 6,647,412 B1 | * | 11/2003 | Strandberg et al. ......... 709/223 |

OTHER PUBLICATIONS

ITU–T (International Telecommunication Union—Telecommunication Standardization Sector of ITU), p. 861, (02/98) (14 pgs.).
PAMS (Perceptual Analysis Measurement System), the British Telecom Brochure (4 pgs.) No Date.
ITU–T (International Telecommunication Union—Telecommunication Standardization Sector of ITU), G.107, (12/98), (25 pgs.).
Simon Broom et al., "Getting the Message, Loud and Clear—Quantifying Call Clarity.", British Telecommunications Engineering, vol. 17, pp. 66–72, Apr. 1998.

* cited by examiner

Primary Examiner—Bharat Barot
(74) Attorney, Agent, or Firm—Nath & Associates; Harold L. Novick

(57) ABSTRACT

A method, a system and equipment for determining quality of telecommunication service over a telecommunication network, which provide: (a) obtaining data on quality of service over a number of routes in the network by determining, for each route, N parameters $p_i$, each reflecting either a quality of transmission of a particular service through said route or a statistical characteristics of said route's availability to a subscriber, and (b) building an objective quality score (OQS) for each of the routes, the OQS being a multi-profile quality estimation equation presenting a sum of N said parameters $p_i$ taken with respective weight functions $W_i(p_i)$ thereof. Based on the score, one or more routes can be selected in the network (for example, for routing), which have the OQS value not lower than a predetermined OQS.

22 Claims, 3 Drawing Sheets

METHOD AND SYSTEM FOR CONTROLLING QUALITY OF SERVICE OVER A TELECOMMUNICATION NETWORK

FIELD OF THE INVENTION

The present invention relates to a method and a system for controlling quality of service over a network, and in particular—over a packet switched data network, such as over IP (Internet Protocol).

BACKGROUND OF THE INVENTION

It is widely known, that modem telecommunication networks comprise different interconnected domains, for example a PSTN (Public Switched Telephone Network) which was originally designed for handling voice calls, and a packet switched network which, by its nature, is data oriented. Nowadays, all kinds of services or transmission types (e.g., voice, fax or data) are transmitted through the combined networks and are inevitably subjected to many factors which affect the quality of service expected by a particular subscriber. The above-mentioned factors stem not only from the nature of a particular network domain, but also (and to the great extent) from the growing traffic load in the modem telecommunication networks.

In packet switched networks, real time services such as voice, fax, real-time video conference (e.g., packetized voice signals of Voice over IP), are mixed with data signals and, as a result, suffer from degradation that is not encountered in the regular circuit-switched networks (e.g., PSTN). The degradation may occur due to such known packet networks' problems, as packet loss, packet delay and packet delay variation (so-called jitter) which are known as specific criteria of data transmission quality.

While in the PSTN the voice channels are assigned to a constant, assured bandwidth, in packet switched networks the bandwidth varies dynamically, depending on data and voice traffic in the network. In order to ensure a given quality of the voice signal, a service provider in the packet switched network must assure both a minimum bandwidth at all times, and keep the three criteria mentioned above within given limits. For example, it becomes difficult to carry on a voice conversation if the packet delay exceeds 200 ms.

While for data traffic control in the packet switched networks it may be enough to monitor some performance criteria such as the packet delay, in the case of voice traffic various parameters combine in an infinite number of possible combinations so that, there is no simple correlation between these parameters and the actual voice quality heard by the caller.

Voice networks have traditionally been tested by injection of test sentences at one (transmitting) end, and having this sentence heard and its clarity subjectively graded by a group of people at the other (receiving) end of the path. The test result is called a Mean Opinion Score (MOS) and ranges from 1 (poor) to 5 (excellent).

To convert this obviously subjective method to an objective one, real measurements of quality should serve the basis for conclusions. To this end, two main approaches were proposed. The first one can be classified as an intrusive approach, which is based on comparison of a transmitted signal to the same received signal, and examining the difference. There are a number of models enabling to arrive to the MOS results using the above comparison, for example PSQM model (described in the International ITUT standard Q862) and PAMS model developed by British Telecom (BT). It should be noted, that PAMS is the only model which takes into account problems in the quality of service which may be brought to data networks by phenomena such as packet delay, packet loss, jitter, etc. The second approach is a non-intrusive approach based on measuring physical parameters such as noise, delay, echo etc., and improving thereof up to a satisfactory level. A number of models exist, for example E-model of ITUT standard body and a CCI (Call Clarity Index) developed in BT. Presently, there is no such a non-intrusive model, which would take into account problems of quality degradation due to data networks.

Nowadays, voice services providers which utilize packet switching in their networks, cannot assure the desired voice quality to their customers in advance, since the voice quality of service is not monitored in the networks to the extent allowing that.

On the other hand, fully loaded networks suffer from shortage of lines, and very often the quality of service (with respect to voice, fax and data) is reduced due to low connectivity in the network and low availability of destination points.

None of the relevant methods and systems known to the Applicant describes or suggests any combined Quality of Service estimation mechanism for a network, which would enable integral monitoring of the quality of service, and control of the quality of service to be provided.

SUMMARY OF THE INVENTION

It is therefore the object of the present invention to provide a method of determining quality of the telecommunication service over a telecommunication network based on a novel, combined estimation of quality of service for this network. A further object of the invention is to provide a method, a system and an equipment for monitoring and controlling the quality of service in the network, based on the combined estimation thereof. The invention is most effectively applicable to modem telecommunication networks including packet switched networks.

The above main object can be achieved by a method of determining quality of telecommunication service over a telecommunication network, the method including the following steps:

a) obtaining data on quality of service over a number of routes in the network by determining, for each route, N of parameters $p_i$, each of said parameters $p_i$ reflecting either a quality of transmission of a particular service (transmission type) through said route or a statistical characteristics of said route's availability to a subscriber, b) building an objective quality score (OQS) for each of said routes, the OQS being a multi-profile quality estimation equation presenting a sum of N said parameters $p_i$ taken with respective weight functions $W_i(p_i)$ thereof.

It is further proposed, that the weight functions $W_i(p_i)$ reflect a preferred profile of the quality of service in said network and are presented as positive numbers in the range $0 \leq W_i(p_i) \leq 1$ selected so that M values of said weight functions $W_i(p_i)$ are more than 0, ($M \leq N$), and the sum of the selected values of the $W_i(p_i)$ is equal to 1.

Preferably, the method also comprises step (c):

c) selecting one or more routes having the OQS value not lower than a predetermined OQS value for further routing the telecommunication services there-through.

It should be mentioned, that for effecting control of the service quality, an additional step is to be effected, i.e. the step of routing the telecommunication services over said one or more selected routes.

It is understood, that said particular service (transmission type) is one of components in a non-limiting list comprising voice, fax and data.

The mentioned equation can be presented in the following form:

$$OQS = \sum_{i=1}^{N} W_i(p_i)p_i \qquad 1$$

wherein:

OQS—is the objective quality score estimation pi—a value of a parameter "i" in a particular route in the network $W_i(p_i)$—weight function of the parameter "i" (in one simple particular case $W_i(p_i)$ may be a constant coefficient of the parameter "i")

N—is the number of parameters defined for the network.

The above-mentioned parameters preferably comprise at least the following five (N=6) characteristics of the quality of service for particular transmission types and the network of interest:

$p_1$—is a voice Quality of Service parameter QoS which can be estimated using at least one of the following methods known in the prior art: CCI (Call Clarity Index), PAMS (Perceptual Analysis Measurement System), PSQM (as defined in the international ITUT standard Q-862), E-model, etc., $P_2$—is a Fax Quality of Service parameter estimated, for example, according to a statistically obtained ratio between a number of errors during a fax transmission and a number of pages in the fax, or other methods, for example based on checking a coded message enclosed in a particular fax packet.

$P_3$—is a Data Quality of Service parameter which can be estimated based on such a widely known transmission parameters as Packet delay, Packet loss and Packet delay variation (jitter);

$P_4$—is Line Availability in the network, which parameter can be calculated using statistical parameters of physical reliability of a line, i.e., MTBF (MeanTime Between Failure) and MTTR (MeanTime to Repair);

$P_5$—is Connectivity of the network which may be obtained from statistically calculated parameters ASR (Answer Seizure Ratio) and NER (Network Effectiveness Ratio) estimating a number of successful calls with respect to a number of the initiated calls, and calls provided by the destination network portion, respectively;

$P_6$—is a Service Availability parameter, statistically reflecting ratio is of the responses "busy" or "not available" to the inquiry calls, with respect to the requested destination numbers or sites.

In one version of the method, the weight functions $W_i(p_i)$ of the quality of service can be selected by a service provider for forming a number of profiles of services to be offered to clients.

The mentioned pair of a service provider and a client may reflect various combinations, for example a service provider and a particular customer (subscriber); two service providers being inter-carriers; a service provider and a "clearing house"; a clearing house and a network provider and the like.

In another possible version, the weight functions $W_i(p_i)$ of the quality of service can be selected by a client in order to form its own profile of service. The client uses the weight functions for estimating various options of the service profile and further choosing the most reasonable one.

In both mentioned versions a so-called service level agreement (SLA) can be signed (accepted) between the service provider and the client, which agreement comprises both the selected weights and the selected OQS parameter.

In practice, the client selects the mentioned M parameters with the weight functions thereof (i.e., the parameters which are important for the services of interest), thereby selecting the preferred profile of service. The service provider estimates OQS for a variety of routes using the profile of service obtained from the subscriber, for proposing variants of the "total" quality to the subscriber. The subscriber is then invited to select a preferred OQS value(s). Upon doing that, the service provider accepts its obligation to route all the services of this particular subscriber along those routes which have been found to satisfy the required total quality of service OQS.

It should be appreciated that the above method may terminate with a step (d) of routing the services over one or more routes which have been selected at step (c).

However, the method may further comprise a step (e) of monitoring the quality of service in real time and comparing it with the predetermined value OQS.

Preferably, the step (e) comprises obtaining data on quality of service over a particular selected route in the network by determining M of said parameters $p_i$ and building an objective quality score (OQS) for said route, the OQS being a multi-profile quality estimation equation presenting a sum of M said parameters $p_i$ taken with said weight functions $W_i(p_i)$.

Those skilled in the art understand that in such telecommunication networks as PSTN and ATM the routing is accomplished in a fixed way. It means, that if the routes selected at step (c) are then found to supply the quality of service lower than was expected, the situation can be improved only physically, for example by effecting repairs in the network. In other words, the monitoring allows for obtaining the updated information about channels' quality which might be useful for the purposes of the equipment maintenance and improvement of the service.

It is known, that for IP domains the situation is different, i.e. the routing is more flexible. In view of this, the method may comprise a feedback feature, i.e.

step (e) additionally comprises real-time monitoring the OQS of a plurality of routes in the network, and a step of near real-time re-routing the telecommunication services to those routes which are characterized by OQS value not lower than the predetermined value; the re-routing is provided in case that the selected route has the OQS lower than the predetermined value.

For example, the real-time monitoring the OQS of a plurality of routes in the network with respect to a particular transmission type may be provided in the following way:

obtaining data on quality of service concerning said particular transmission type from a plurality of points in the network, distributed therein, processing the obtained data to determine a corresponding current value of $p_i$ parameter for said plurality of points, and defining in said network a number of alternative transmission paths for said transmission type, each having a particular current value of the parameter $p_i$.

In one particular version of the method, said parameter $p_i$ is the Voice Quality of Service parameter QoS, and said network comprises a packet switched network such as IP network.

It should be noted that more than one $p_i$ can be determined and monitored according to the above version. The re-routing of the particular transmission type signal can be thus effected via those of said transmission paths having current values of said at least one $p_i$ parameter being not lower than said selected $W_i(p_i)p_i$.

The method comprising feedback enables the service provider to fulfill the obligations according to the Service Level Agreement (SLA) proposed to a customer by assuring a desired end-to-end quality of service in the network.

Further, the method may include a step of quality related call billing, where a call is billed taking into account the quality actually delivered or preliminarily ordered. It is natural that any combination of the parameter $p_i$ with its weight function $W_i(p_i)$ having values from 0 to 1 can be associated with an appropriate price function. Based on this, the OQS estimation can be reflected by a specific price range offered by the service provider. Similarly, the SLA signed between the service provider and the subscriber reflects not only the profile of service the subscriber has selected, but also the prices associated with this profile. Alternatively or in addition to the SLA, the caller may indicate the level of quality/cost desired in real time (for example, for an international voice call he/she may request a higher QoS than for a national long distance call).

The method would enable the service providers to offer voice, fax and data transmission services of various quality ranges and at appropriate prices, beginning from full price high quality services up to premium services.

According to a second aspect of the present invention, there is also provided a system for determining and monitoring quality of service in a telecommunication network.

The system for determining a quality of service estimate in a network may comprise:
  a plurality of test units capable of collecting data for determining value of at least one quality of service parameter $p_i$ with respect to a particular transmission type at various points in said network, said parameter $p_i$ being one of N quality of service parameters;
  a server computer adapted to communicate with said test units for receiving therefrom the collected data on said at least one parameter at said respective points of the network, said server computer being capable of defining a number of transmission paths (routes) in the network, each having its own said quality of service parameter $p_i$.

Preferably, the server computer is adapted to communicate with the test units collecting data on at least one additional quality of service parameter of said N quality of service parameters, and, based on the collected data concerning the points and the parameters, the server computer being capable of building an objective quality score (OQS) for a number of routes in the network, wherein the OQS is a multi-profile quality estimation equation presenting a sum of N said parameters pi taken with respective weight functions $W_i(p_i)$ thereof.

According to the preferred embodiment of the system, said plurality of test units are also capable of monitoring said at least one parameter $p_i$ in real time, while said server computer adapted to define in real time a number of transmission paths each having its own current value of quality of service parameter $p_i$.

In one particular embodiment of the system, where the voice QoS parameter $p_i$ is monitored, it enables the service provider to measure the audio quality of individual packetized voice channels (voice transmission paths) "buried" in a data communications traffic.

Preferably, the server computer is also capable of ranking said paths according to their $p_i$ parameter. Such an ability can be used for various purposes, for example: for reporting on poor quality of particular channels, for further routing a particular transmission type incoming the packet network, and/or for assigning different tariffs to the paths with different ranks of $p_i$.

According to one exemplary embodiment of the system, wherein the packet switched network cooperates with a gateway circuitry where an analog voice signal is packetized and routed, the above-mentioned gateway circuitry comprises a service provider's network element responsible for routing said voice signals, and the server computer is capable of providing said element with information on the defined transmission paths and respective values of their voice quality of service $p_i$(QoS) parameter, thereby enabling the routing of the voice signals via those of said transmission paths having predetermined values of the QoS parameter. Actually, in this embodiment the system for monitoring becomes a system for providing improved voice service in a packet switched network.

The mentioned service provider's network element where the analog voice signal is packetized and routed (as well as the element where the packetized voice signal is de-packetized and passed to its destination) may constitute a Voice over IP (VoIP) gateway or gatekeeper.

The above-mentioned server computer, and an equipment kit including at least one such server computer and, optionally, a number of the described test units—form additional aspects of the present invention.

For example, a server computer can be designed for determining a quality of service in a network, the server computer being designed for communicating with a plurality of test units for receiving therefrom data on quality of service parameters $p_i$ at various points of the network; based on the collected data concerning the points and the parameters, the server computer being capable of building an objective quality score (OQS) for a number of routes in the network, wherein the OQS being a multi-profile quality estimation equation presenting a sum of said parameters $p_i$ taken with respective weight functions $W_i(p_i)$ thereof., wherein
  each of said test units being adapted to determine value of at least one quality of service parameter $p_i$ with respect to a particular transmission type.

The service computer can definitely be used for monitoring the quality of service, and for routing in the network based on the OQS estimation.

Further features of the system will become apparent from the following description of the preferred embodiments.

BRIEF DESCRIPTION OF THE DRAWINGS

The method and the system according to the invention will be further explained with reference to non-limiting examples illustrated in the attached drawings in which.

DETAILED DESCRIPTION OF THE PREFERRED EMBODIMENT

Figure 1:
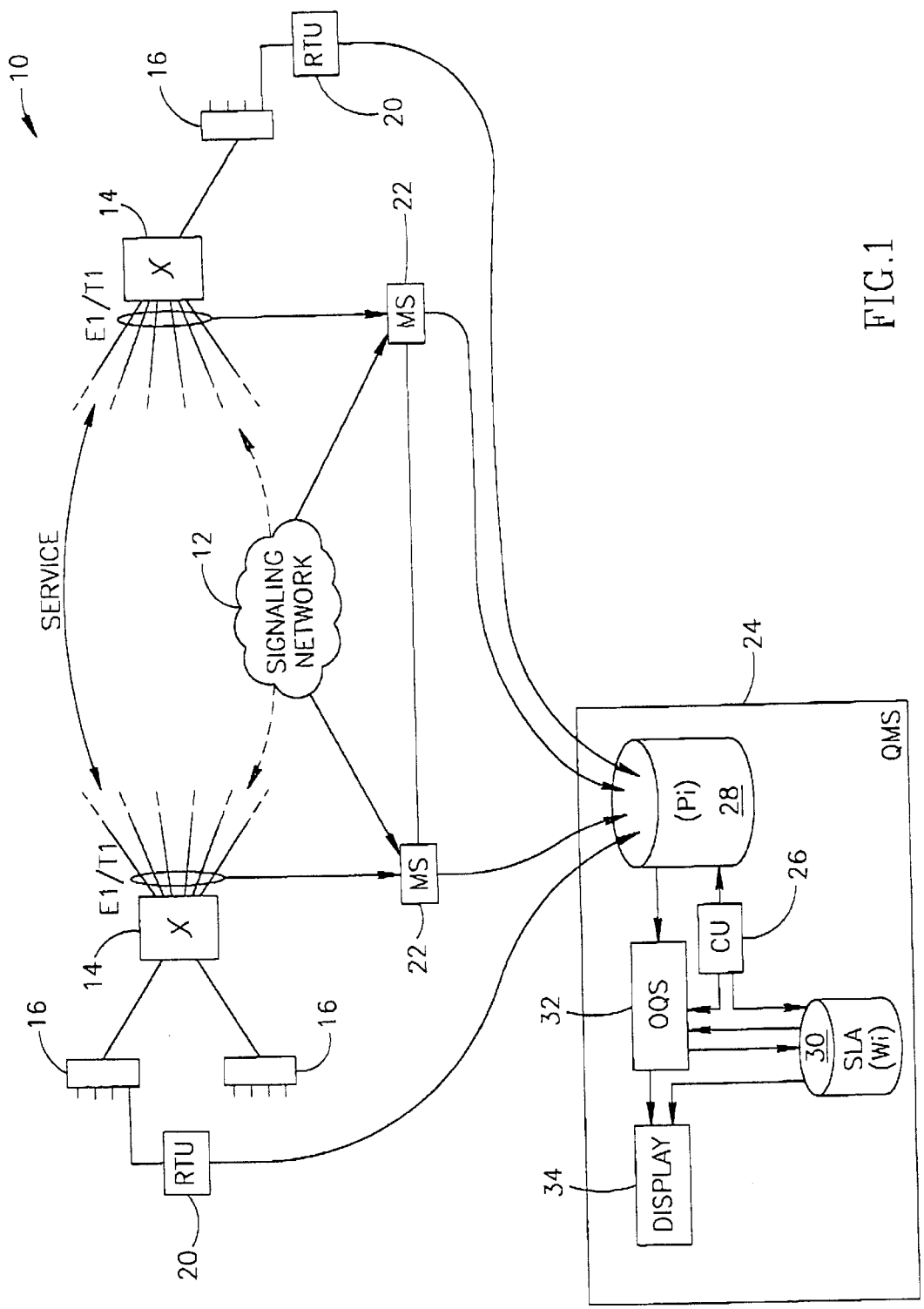
FIG. 1 is a pictorial representation of a system for controlling quality of service over a PSTN network.

FIG. 1 illustrates a system implementing the described method, for controlling the quality of service in a PSTN network being an example of to the network with conventional (fixed) routing. Other examples of such a network can be an ATM (Asynchronous Transport Mode) network and a cellular telephone network.

The network 10 shown in the figure is a conventional PSTN network with an out-of band signaling network 12, such as a widely known signaling system SS7. Two end points 14, between which the telecommunication service is provided, are equipped with access units 16. The left-hand end point 16 is, for example a Central Office PSTN switch having a plurality of E1/T1 output lines. A call following via one of the lines is transmitted via a number of middle layer switches 18 to the E1/T1 lines of the right-hand end point 14, and then to its access unit 16. The quality of service of the network 10 will be estimated for the end-to-end communication. To this purpose, at least two opposite access units 16 are provided with Remote Test Units (RTU) 20 for intrusive quality monitoring which are switched in the access lines and are capable of obtaining particular quality parameters from messages of a particular call transmitted there-between over the network (to be more exact, the parameters are determined by comparison transmitted signals to the received ones). The RTU 20, for example, can be manufactured similar to the monitoring unit Quali.Net™ of ECTel®, Israel. The system also comprises a number of non-intrusive Monitoring Systems (MS) 22 for PSTN which are capable of obtaining data on a particular transmission type (service) from E1/T1 lines of end points 14, and also signaling data from the signaling network 12, for producing therefrom a number of quality parameters with respect to a particular call and a particular route (transmission path). The MS 22 can be similar to the ECTel's product QualiView. Data obtained by the probes 20 and 22 is processed by a Quality Management Server (QMS) 24 controlled by a central processor (control unit CU) 26. The collected data is received by a Data Collector 28 where CDRs (Call Detail Records) are built and values of the parameters $p_i$ are determined for the route under examination. The weight functions $W_i(p_i)$ preliminarily introduced into a so-called block 30 (also serving for storing Service Level Agreements) are used for calculating the value of OQS for the route (transmission path) under examination by unit 32, based on the equation (1). Results of the OQS estimation for a number of routes is further displayed by a monitor 34. The checking stage of the method is finished. The telecommunication services can be then permanently routed, via those transmission paths (routes) which demonstrate a suitable value of OQS. Real time monitoring of the quality of service can be provided in a similar way just for the purpose of displaying whether the expected level of quality (stored in the block 30) corresponds to the real level (obtained from block 32).

Figure 2:
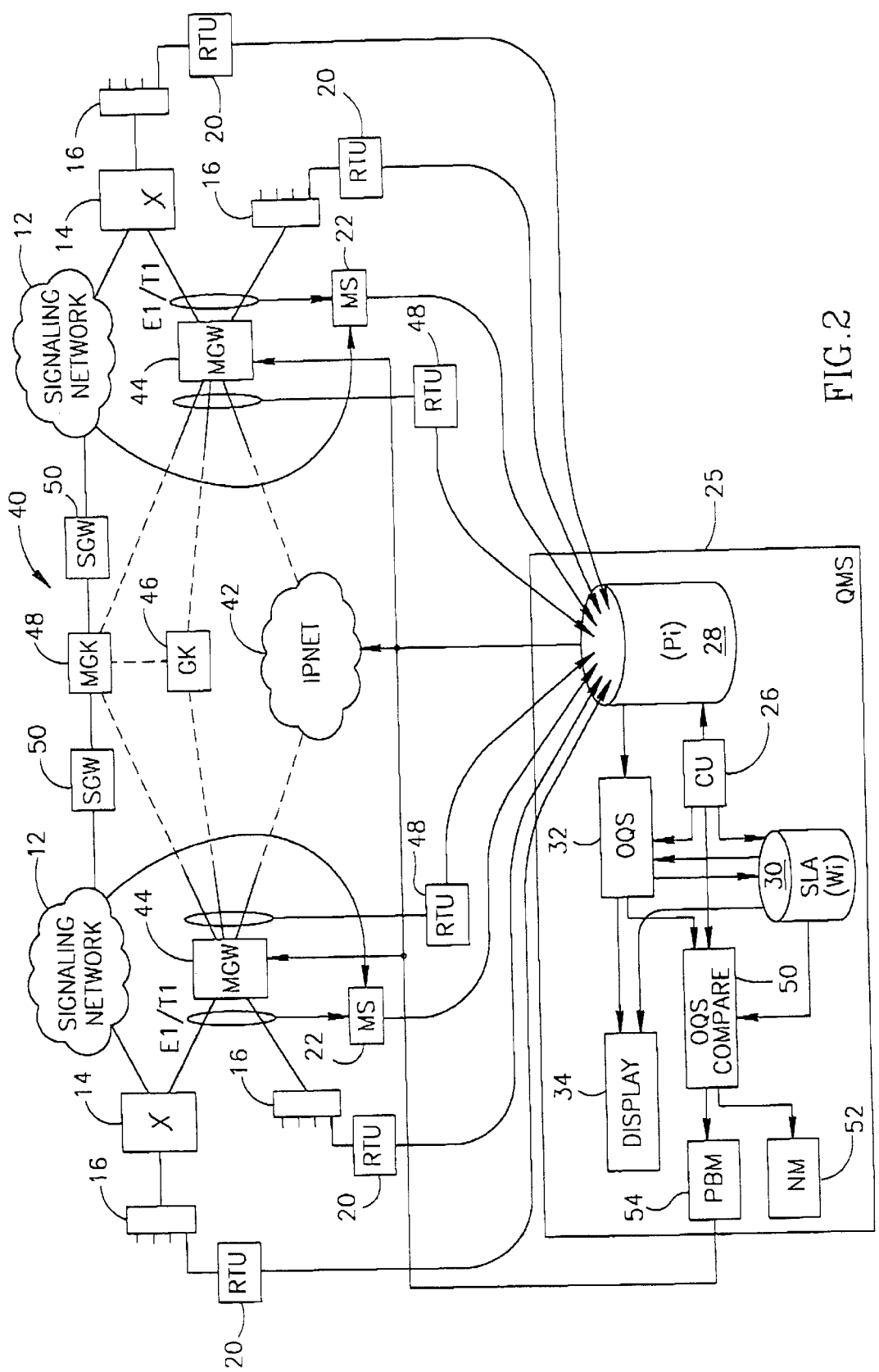
FIG. 2 is a pictorial representation of a system for controlling quality of service over a data network such as IP network.

FIG. 2 illustrates another system implementing the described method, i.e., a system for controlling the quality of service in a network comprising a packet switched network (in this figure, an IP network). Units similar to those illustrated in FIG. 1, will be marked with similar numbers. The network 40 comprises a PSTN network and a IP network 42, connected by two Media Gateways 44. The gateways 44 are controlled by a Gatekeeper 46 and a Media Gateway Control 99 (MGC) unit 48. The MGC 48 interacts with the Signaling network 12 (two parts thereof are shown) via Signaling Gateways 50.

In this particular embodiment, each of the Gateways 44 is connected at one end to E1/T1 lines of the PSTN switch 14 and the access unit 16, while at the other end to the IP network 42. Monitoring Systems (MS) 22 are therefore non-intrusively placed at the E1/T1 inputs of the gateways 44 to collect data both from these inputs, and the signaling network 12. Monitoring Systems (MS) 48 are connected between the gateways 44 and the IP network 42 and capable of collecting and processing both the transmission type data and the signaling data which is exchanged in the IP network while a particular call is executed.

In this particular embodiment, a Quality Management Server (QMS) 25 collects data from all types of probes (RTU and MS blocks 20, 22 and 48). It should be noted, that the types of probes to be included in the system are usually selected according to the client's profile of service, i.e., all types of the probes are not required by default. The Data Collector 28 builds CDRs on particular calls in respect of particular initial routes in order to obtain values of quality parameters $p_i$ for these routes. The Objective Quality Score OQS is then calculated by the unit 32 based on the weight functions $W_i(p_i)$ obtained from the block 30 which serves for storing the preferred profiles of quality of service for different subscribers (and also for further storing the OQS values corresponding to the SLAs of particular subscribers). The OQS value of a particular route can be displayed by a display 34, with a reference to a OQS according to the SLA. Additionally, block 50 is provided for real-time comparing the OQS with the OQS according to the SLA in the monitoring regime. The unit 32, as well as units 28, 30 and 50 are controlled by the central processor (CU) 26. The control system illustrated in this figure enables obtaining feedback concerning the OQS parameter in near real-time and effecting re-routing of the telecommunication services. In particular, if block 50 issues a signal that the value of OQS is lower than a predetermined value stored in the SLA unit 30, this signal activates two interacting management systems 52 and 54. For example, a Network Manager 52 and a Policy Based Manager 54 can be provided, capable of controlling the Media Gateways 44 and routers (not shown) in the IP network for re-routing a particular telecommunication service via routes for which the OQS value is not lower that the predetermined OQS.

After a SLA is signed between the service provider and the subscriber, each packet issued by a Gateway is provided with a specific code incorporated in its particular portion (for example, in a header) and indicating its routing schedule (for example, a particular architecture of the network may support the described function by a protocol Diffserv).

In this embodiment, the Police Based Manager is responsible for routing each and every packet arriving from a Gateway according to this code. However, if a re-routing is required by the QMS 25, the routing code comprised in the appropriate packets is changed with the aid of the Network Manager 52 to direct the packets through a suitable available route; the Policy Based Manager 54 will be therefore correspondingly informed on the change.

Such suitable available routes can be found, in near real-time, by statistically processing the data collected by the Data Collector 28.

Figure 3:
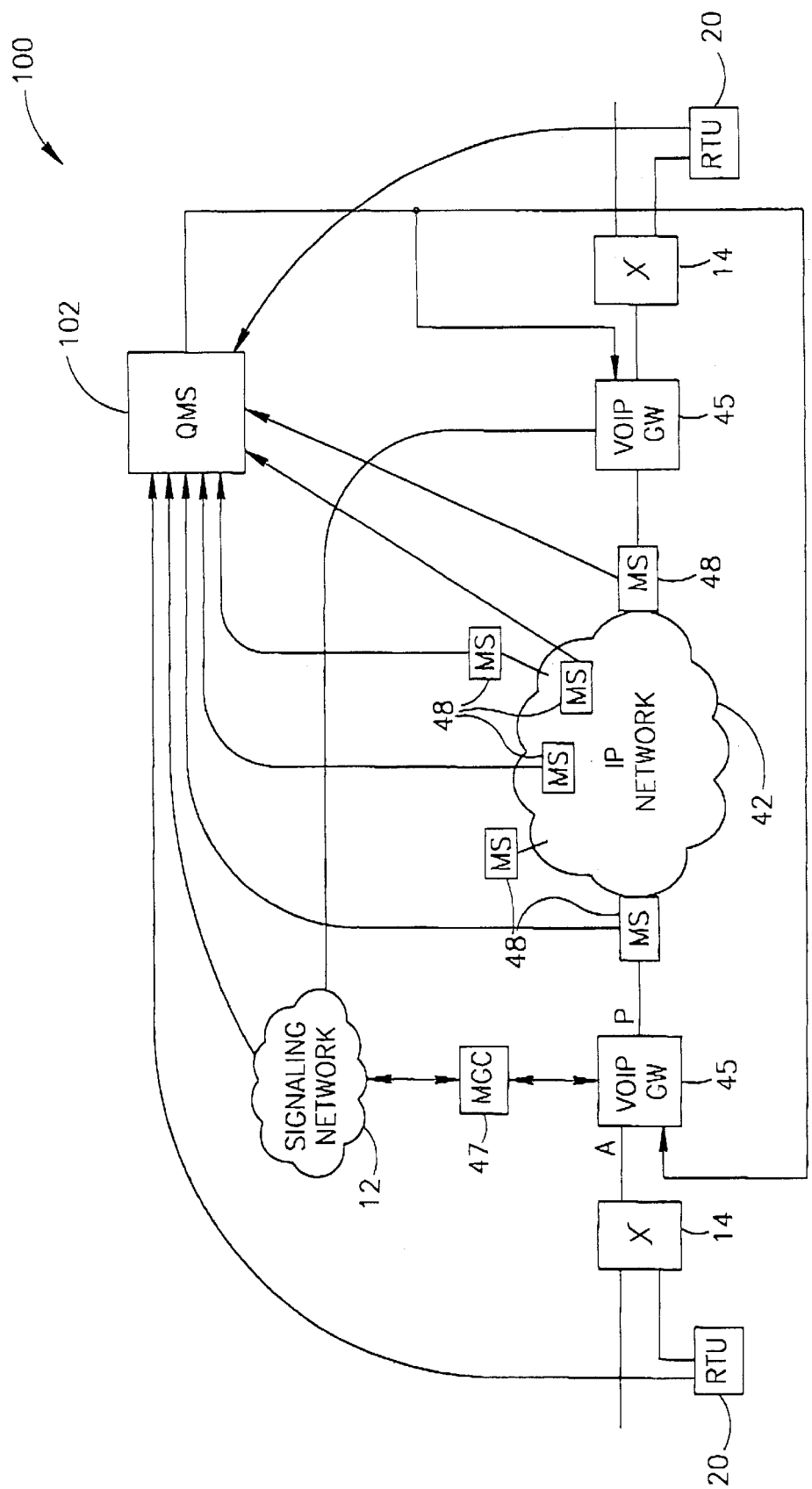
FIG. 3 is a pictorial representation of a system for real-time monitoring of a Voice Quality of Service over the IP network.

An example of determining such routes (transmission paths) is illustrated in FIG. 3. As before, similar blocks will be marked with similar reference numbers. The system 100 is intended for providing quality service over a packet switched network comprising two sub-networks: PSTN and IP network 42. For the sake of simplicity, in this particular embodiment the system is considered to monitor only the Voice over IP quality in the data network i.e., according to the SLA the $W_1(p_1)=1$, while the remaining components of the OQS equation are neglected. Let us assume that an initial voice telephone call comes to a Local Switch 14 and is transferred therefrom to a VoIP Gateway 45 in the analog form. The Gateway 45 is controlled by a Media Gateway Controller 47 and performs a number of operations, among which the packetizing of the voice signal and the routing thereof through the data network 42 based on the currently available channels with the bandwidths assigned to them. Upon arrival of the packetized voice signals to a gateway 45 placed at the opposite end of the voice transmission path the signal is de-packetized and passed therefrom to its destination through the opposite end point swotch 14. The network is provided with out-of band signaling network 12, such as SS7, operative to supply signaling information concerning all the communications taking place in the network.

In conventional systems, a voice signal packetized by a data network gateway passes through the network via a randomly selected voice transmission path which may be composed of a number of sections having different quality parameters due to different bandwidths etc. Therefore, quality of the voice service (QoS) over the packet switched network is never known in advance in conventional systems.

The inventive system comprises a plurality of Monitoring Systems 48 (six units are shown) placed at a number of points in the packet switched network, including, for example, a number of routers and intended for collecting appropriate data and determining the quality of voice service (QoS) at the respective points. The Monitoring Systems 48 are controlled by a Quality Management Server (QMS) marked 102 and supply the Server with data concerning the quality of voice service in the near real time. Intrusive RTU 20, connected to the end-point switches 14, also communicate with the QMS 102. The QMS 102 is also linked to the signaling network 12 via MSs similar to MS 22 (not shown). The QMS 102 is capable of calculating the Objective Quality Score using data collected from the currently active probes RTUs and MSs and according to the Service Level Agreement to determine the current values of $W_1(p_1)p_1$ at the points of the active probes. Based on the collected real-time data, the QMS defines a number of voice transmission paths in the data network 42, wherein each path is characterized with a particular level of voice quality of service QoS. In other words, the QMS correlates the TUs' measurements and arrives at QoS current figures for alternative paths in the network. The server is also able to rank the defined paths according to their QoS current values with respect to the agreed value of the QoS parameter being $W_1(p_1)\,p_1$, for selecting therefrom paths suitable for routing voice. The data on the selected paths is then fed to the Gateways 45.

The QMS 102, together with the system of mentioned probes, perform a novel function of monitoring the voice quality of service in the data network, and the results of the monitoring can be used in a number of ways. In this particular embodiment the routing of incoming voice calls, instead of being provided randomly, is made via those voice transmission paths in the network 42, which are considered to have sufficiently high voice quality of service QoS, or via those having a particular rank required by the customer or stated by the service provider. The QMS 102 may optionally transfer information concerning the ranks of the voice quality to a billing system (not shown) for further processing in order to implement quality-related call billing.

It should be mentioned that names of the network elements used in the present description and drawings are taken from various standard bodies, since no common terminology has been developed up to date. It should also be emphasized, that the architectures given in the drawings and described in the specification are for the purpose of illustration of possible examples only.

Whilst the invention has been described with particular reference to some preferred embodiments, it should be appreciated that modifications will be apparent to those skilled in the art and the invention contemplates such modifications as fall within the scope of the appended claims.

What is claimed is:

1. A method for determining quality of telecommunication service over a telecommunication network, including steps of:
    a) obtaining data on quality of service over one or more routes in the network by determining, for each route, N of parameters $p_i$, each of said parameters $p_i$ reflecting either a quality of transmission of a particular service through said route or a statistical characteristics of said route's availability to a subscriber,
    b) building an objective quality score (OQS) for each of said routes, the OQS being a multi-profile quality estimation equation presenting a sum of N said parameters $p_i$ taken with respective weight functions $W_i(p_i)$ thereof.

2. The method according to claim 1, further comprising a step
    (c) determining one or more routes having the OQS value not lower than a predetermined OQS value, suitable for further routing the telecommunication services therethrough.

3. The method according to claim 2, further comprising a step (d) of routing the services over one or more routes determined at step (c).

4. The method according to claim 3, further comprising a step (e) of monitoring the quality of service in real time and comparing it with the predetermined OQS value.

5. The method according to claim 4, wherein the step (e) comprises obtaining data on quality of service over a particular selected route in the network by determining M of said parameters $p_i$ and building an objective quality score (OQS) for said route, the OQS being a multi-profile quality estimation equation.

6. The method according to claim 4, wherein step (e) additionally comprises real-time monitoring the OQS of a plurality of routes in the network, and a step of near real-time re-routing the telecommunication services to those routes which are characterized by OQS value not lower than the predetermined value; the re-routing is provided in case that the selected route has the OQS lower than the predetermined value.

7. The method according to claim 6, wherein the real-time monitoring the OQS of a plurality of routes in the network with respect to a particular transmission type is provided in the following way:
    obtaining data on quality of service concerning said particular transmission type from a plurality of points in the network, distributed therein,
    processing the obtained data to determine a corresponding current value of $p_i$ parameter for said plurality of points, and
    defining in said network a number of alternative transmission paths for said transmission type, each having a particular current value of the parameter $p_i$.

8. The method according to claim 7, wherein said parameter $p_i$ is the Voice Quality of Service parameter QoS, and said network comprises a packet switched IP network.

9. The method according to claim 7, wherein more than one parameter $p_i$ is determined and monitored.

10. The method according to claim 1, wherein said equation is presented in the following form:

$$OQS = \sum_{i=1}^{N} W_i(p_i) p_i \qquad 1$$

wherein:
OQS—is the objective quality score estimation
pi—is a value of a parameter "i" in a particular route in the network
$W_i(p_i)$—is a weight function of the parameter "i"
N—is the number of parameters defined for the network, and wherein
the weight functions $W_i(p_i)$ reflect a preferred profile of the quality of service in said network and are presented as positive numbers in the range $0 \leq W_i(p_i) \leq 1$ selected so that M values of said weight functions $W_i(p_i)$ are more than 0, (M≦N), and the sum of the selected values of the $W_i(p_i)$ is equal to 1.

11. The method according to claim 1, wherein said particular service is one of components in a non-limiting list comprising voice, fax and data transmission types, and wherein said parameters comprise at least six (N=6) characteristics of the quality of service for particular transmission types and the network of interest, said parameters being:
$p_1$—a voice Quality of Service parameter QoS;
$p_2$—is a Fax Quality of Service parameter;
$p_3$—is a Data Quality of Service parameter;
$p_4$—is Line Availability in the network;
$p_5$—is Connectivity of the network;
$p_6$—is a Service Availability parameter.

12. The method according to claim 1, wherein the weight functions $W_i(p_i)$ of the quality of service are selected by a service provider for forming a number of profiles of service suitable for offering to clients.

13. The method according to claim 1, wherein the weight functions $W_i(p_i)$ of the quality of service are selected by a client for forming a profile of service.

14. The method according to claim 1, further including a step of quality related call billing.

15. The method according to claim 1, for controlling the quality of service in said network, further comprising a step of routing the transmission services over one of said routes having the OQS value not lower than a predetermined OQS value.

16. A system for controlling quality of service in a telecommunication network, capable of implementing the method according to claim 1.

17. A system for determining a quality of service QoS estimate in a telecommunication network, comprising:
a plurality of test units capable of collecting data at various points in said network, each of said test units being adapted to determine value of at least one quality of service parameter $p_i$ with respect to a particular transmission type, said parameter $p_i$ being one of N quality of service parameters;
a server computer adapted to communicate with said test units for receiving therefrom the collected data on said quality of service parameters at the respective points of the network; based on the collected data concerning the points and the parameters, the server computer being capable of building an objective quality score (OQS) for one or more routes in the network, wherein the OQS being a multi-profile quality estimation equation presenting a sum of N said parameters $p_i$ taken with respective weight functions $W_i(p_i)$ thereof.

18. The system according to claim 17, wherein said plurality of test units are capable of monitoring said at least one quality of service parameter $p_i$ in real time, while the server computer is adapted to define in real time a number of transmission paths each having its own current value of quality of service parameter $p_i$.

19. The system according to claim 18, wherein said at least one monitored parameter $p_i$ is a voice QoS parameter, thereby said server computer being capable of measuring the audio quality of individual packetized voice transmission paths.

20. The system according to claim 19, for a packet switched network, wherein said network cooperates with a gateway circuitry where an analog voice signal is packetized and routed, the above-mentioned gateway circuitry comprises a service provider's network element responsible for routing said voice signals, and the server computer is capable of providing said element with information on the defined transmission paths and respective values of their voice quality of service $p_i$(QoS) parameter, thereby enabling the routing of the voice signals via those of said transmission paths having predetermined values of the QoS parameter.

21. The system according to claim 17, wherein said server computer is also capable of ranking said paths according to their at least one $p_i$ parameter.

22. A server computer for determining quality of service in a network, the server computer being designed for communicating with a plurality of test units for receiving therefrom data on quality of service parameters $p_i$ at various points of the network; based on the collected data concerning the points and the parameters, the server computer being capable of building an objective quality score (OQS) for one or more routes in the network, wherein the OQS being a multi-profile quality estimation equation presenting a sum of said parameters $p_i$ taken with respective weight functions $W_i(p_i)$ thereof, wherein
each of said test units being adapted to determine value of at least one quality of service parameter $p_i$ with respect to a particular transmission type.

* * * * *